United States Patent
Haardt et al.

(10) Patent No.: US 6,743,870 B1
(45) Date of Patent: Jun. 1, 2004

(54) PROCESS FOR EARLY DETECTION OF REACTOR FOULING IN GAS PHASE POLYMERIZATION

(75) Inventors: Hans-Jurgen Haardt, Pulheim (DE); Hans-Peter Hemmersbach, Cologne (DE); Michael Muller, Cologne (DE); Hans-Ludwig Niederberger, Rommerskirchen (DE); Detlef Obermann, Dormagen (DE); Johannes Schoofs, Dormagen (DE); Karl-Heinz Werle, Dormagen (DE)

(73) Assignee: BP Chemical Limited, London (GB)

( * ) Notice: Subject to any disclaimer, the term of this patent is extended or adjusted under 35 U.S.C. 154(b) by 510 days.

(21) Appl. No.: 09/722,356

(22) Filed: Nov. 28, 2000

Related U.S. Application Data

(63) Continuation of application No. PCT/GB99/01656, filed on May 26, 1999.

(30) Foreign Application Priority Data

May 28, 1998 (EP) .............................................. 98430014

(51) Int. Cl.[7] .................................................. C08F 2/34
(52) U.S. Cl. ...................... 526/74; 526/901; 209/127.4; 73/12.05; 73/28.02; 73/702; 73/26
(58) Field of Search ................ 526/74, 901; 209/127.4; 73/12.05, 28.02; 702/26

(56) References Cited

FOREIGN PATENT DOCUMENTS

JP          05086109 A   *   4/1993

OTHER PUBLICATIONS

Shimizu Setsuo, "Method for Detecting Fouling In Fluidized Bed in Vapor–Phase Polymerization", Abstract of Japanese Publication No. 05086109, Apr. 6, 1993.
Shinju Setsuo, "Detecting fouling of inside wall of gas phase polymerisation reactor . . . ", Derwent Abstract of JP05086109, Apr. 6, 1993.

* cited by examiner

*Primary Examiner*—William K. Cheung
(74) *Attorney, Agent, or Firm*—Finnegan, Henderson, Farabow, Garrett and Dunner, L.L.P.

(57) ABSTRACT

A process for early detection of reactor fouling occurring during a gas phase polymerization of olefin(s) using a fluidized bed reactor having a fluidization grid fitted with detection devices.

6 Claims, 1 Drawing Sheet

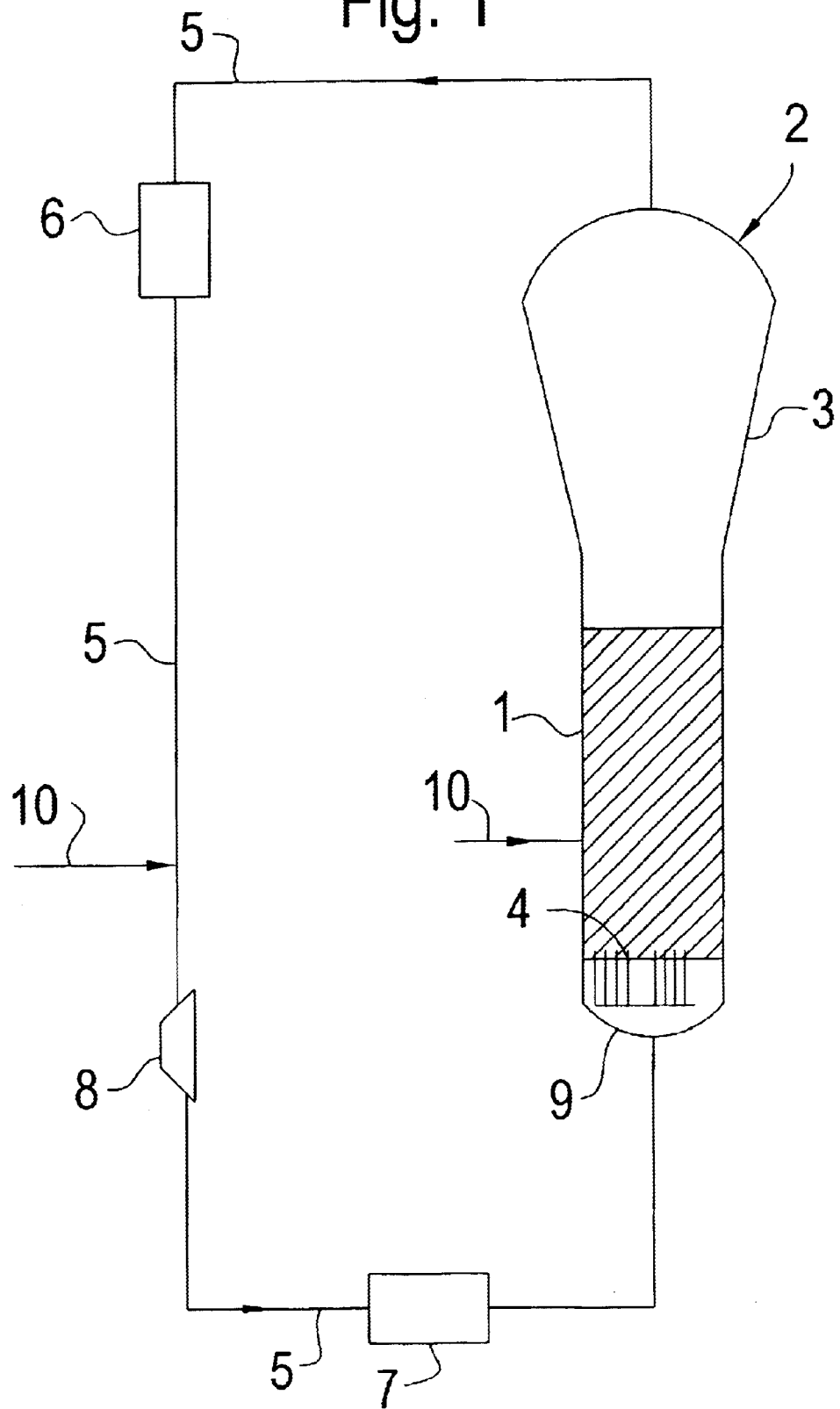

PROCESS FOR EARLY DETECTION OF REACTOR FOULING IN GAS PHASE POLYMERIZATION

This application is a continuation of international application number PCT/GB99/01656, filed May 26, 1999, and claims right to priority of European Patent Application No. 98430014.5, filed May 28, 1998.

BACKGROUND OF THE INVENTION

The present invention relates to a process for early detection of reactor fouling occurring during a gas phase polymerisation. More particularly, the present invention relates to a process for early detection of reactor fouling occurring during a gas phase polymerisation of olefin(s) using a fluidized bed reactor comprising a fluidization grid.

It is known to polymerize one or more monomers in gas phase at a pressure which is higher than atmospheric pressure in a fluidized bed reactor where polymer particles being formed are maintained in the fluidized state by virtue of a reaction gas mixture containing the monomer(s) to be polymerized and travelling in an upward stream. The, polymer thus manufactured in powder form is generally drawn off from the reactor in order to maintain the bed at a more or less constant volume. The process according to the present invention employs a fluidization grid which distributes the reaction gas mixture through the bed. The reaction gas mixture leaving via the top of the fluidized bed reactor is recycled to the base of the latter under the fluidization grid through the intermediacy of an external circulation conduit fitted with a compressor.

In general, the fluidized bed reactors according to the present invention can be represented by a volume whose enclosure (wall) consists of at least one surface of revolution generated by the rotation of a rectilinear and/or curvilinear segment about a vertical axis known as an axis of revolution, and of a disengagement vessel which is above the said surface. The wall of the reactor is therefore a surface of revolution comprising a vertical axis of revolution above which is the enclosure of a disengagement vessel.

Conventional fluidized bed reactors employed for the gas phase polymerization of olefin(s) usually consist of a cylinder (1) with a vertical axis, comprising a fluidization grid at its base, and above which is a disengagement vessel (3), in accordance with FIG. 1, which shows diagrammatically a preferred apparatus for gas phase polymerization according to the present invention. The cylindrical part of the reactor is usually characterised by a height/diameter ratio (H/D) which is comprised between. 1 and 15, preferably between 2 and 8, D representing the internal diameter of the reactor. The disengagement vessel which is above the cylinder capable of containing the fluidized bed has, in principle, a cross-section which is larger than that of the cylinder. It is preferably in the shape of a bulb consisting essentially of a conical frustum of revolution with a vertical axis coinciding with the axis of the cylinder, with an apex pointing downwards with an angle preferably of between 10° and 60° and having above it a dome of substantially hemispherical shape. The small base of this conical frustum coincides with the upper end of the cylinder of the reactor, and its large base coincides with the base of the dome. It may also consist of a vertical cylinder connected to the cylinder capable of containing the fluidized bed by a connecting surface in the shape of a flared conduit. In this case this cylinder has a vertical axis coinciding with the axis of the cylinder capable of containing the fluidized bed and a roof generally of substantially hemispherical shape.

The essential purpose of the disengagement vessel is to slow down the upward gas stream which, after having passed through the fluidized bed, can entrain relatively large quantities of solid particles. As a result of this, most of the entrained solid particles return directly into the fluidized bed. Only the finest particles can be entrained out of the reactor.

Many malfunctions can occur during a gas phase polymerisation. The major consequence of those malfunctions is the generation of agglomerates in the reactor. It can affect the properties of the produced polymer. It can further affect the fluidization characteristics of the fluidization gas, which can lead to channelling and potential irreversible problems.

This agglomerations formation can occur at any time in the reactor following one or a number of different malfunctions.

For example, a malfunction may create the formation of agglomerates by adhesion of molten particles of catalyst and of polymer to the wall of the reactor, inter alia in the disengagement vessel. Agglomerations formation are usually referred to in the prior art as fouling of the reactor.

When these agglomerates become heavy they can separate from the wall and thus block the fluidization grid and/or the system for withdrawing the polymer.

To prevent the fouling of the reactor from affecting the operation of the polymerization system and the quality of the polymer produced, the reactor is stopped at regular intervals, in order to clean the reactor walls and to extract the agglomerates. This can be done by means of water or nitrogen under pressure. Cleaning of this type brings about the introduction of poisons into the reactor, requiring extensive purges of the reactor and drying in order to remove these poisons. This procedure takes time and is not very economical.

There are a lot of disclosures in prior art of those fouling phenomena as well as many different tentative explanations for their occurrence. Sometimes the type of catalyst used is said to be responsible for the fouling; static electricity has also been indicated as being a cause thereof, operating conditions have also been considered as the most important criteria; in fact, many different theories and proposals for explaining and trying to reduce fouling phenomena have been developed.

It would be a major improvement in the art if a simple method was available for early detection of reactor fouling. An early detection of those problems would then allow an early active step to be taken in order to mitigate or even eliminate said problems. Rapidity of action is indeed crucial in the present technology.

The Applicants have now unexpectedly found a method for detection at the early stage of reactor fouling occurring during gas phase polymerization using a fluidized bed reactor comprising a fluidization grid.

SUMMARY OF THE INVENTION

The present invention consequently consists of a process for early detection of reactor fouling occurring during a gas phase polymerisation using a fluidized bed reactor comprising a fluidization grid, characterized in that the upper part of the fluidization grid is fitted with devices capable of detecting the polymer agglomerates failing on and/or hitting said devices.

BRIEF DESCRIPTION OF THE DRAWINGS

FIG. 1 is a diagrammatic illusion of an apparatus for gas phase polymerization of olefin(s) according to the present invention.

DETAILED DESCRIPTION OF THE INVENTION

Although not wishing to be limited to one type of polymerization in particular, the present invention is particularly appropriate to the polymerization reactions of one or more of the monomers such as olefins, polar vinyl monomers, dienes, acetylenes and aldehydes.

The process according to the present invention preferably applies to the polymerization of one or more olefinic monomers such as ethylene, propylene, 1-butene, 1-pentene, 4-methyl-1-pentene, 1-hexene and 1-octene.

The devices used according to the present invention can be any device capable of detecting the polymer agglomerates which fall on it.

According to a preferred embodiment of the present invention, the devices comprise switches which protrude through the grid; when a polymer agglomerate hits a switch, said switch gives an indicative signal of the presence of agglomerates on the grid; there is then, preferably, an automatic reset in order to allow the switch to give a further signal in case of another encounter with an agglomerate hitting the switch.

The devices can be of a mechanical, electrical, electromechanical or pneumatic type, or a combination of said types. The devices are preferably chosen so that they are not influenced by the polymerisation conditions such as temperature and pressure occurring in the reactor. The devices are preferably electromechanical.

Preferred devices are similar or identical to the Telemecanique (Schneider Group) switches sold under the trade name XCK. Such switches are typical position detectors used in the automatised installations and based on a mechanical action on electrical contacts. The Telemecanique XCK-P switches in accordance with. CENELEC EN. 50047 norm are ideally used.

The fluidization grid is thus fitted with devices capable of detecting the polymer agglomerates hitting said devices. The amount and size of devices used depend obviously of the size of the grid, the size of the reactor and the characteristics of the polymer agglomerates to be detected. These devices can be identical or different depending on their position on the grid.

The present invention is particularly useful for the industrial gas phase olefin(s) polymerisation using a fluidized bed reactor comprising a fluidization grid which is a disc, having a diameter preferably comprised between 2 and 7 m, more preferably between 4 and 6 m. The fluidization grid is preferably fitted with at least 4 devices capable of detecting the polymer agglomerates, more preferably at least 10 devices.

Contrary to the legitimate fears which a person skilled in the art in the field of fluidized bed polymerisation might have had when using the said devices according to the present invention, the Applicant has quite unexpectedly found that not only did the process provide an easy and efficient method for the early detection of polymer agglomerates falling on the fluidization grid, and thus for the early detection of malfunctions occurring during a gas phase polymerisation using a fluidized bed reactor comprising a fluidization grid, but also that the process could be applied without any influence on the grid performance and on the fluidization characteristics.

FIG. 1 shows diagrammatically an illustration of an apparatus for gas phase polymerization of olefin(s) according to the present invention. The apparatus includes:

(i) a fluidized bed reactor (1) fitted with a top (2) and a base comprising a fluidization grid (4), and consisting of a cylinder with a vertical side wall and a disengagement or desurging chamber (3) above the said cylinder, the top of the chamber (3) forming the top (2) of the reactor, (ii) an entry chamber (9) for a reaction gas mixture, situated under the grid (4) and communicating with the reactor (1) through the intermediacy of the grid (4), (iii) an external circulation conduit (5) for the reaction gas mixture, connecting the top (2) of the reactor to the entry chamber (9) for the reaction gas mixture and including a compressor (8) and at least one heat exchanger (6, 7), and (iv) devices (for the early detection of agglomerates falling on the grid) protruding through the fluidization grid.

One or more conduits (10) for feeding the reaction gas mixture with constituents such as one or more olefins, for example ethylene or propylene or C4 to C10 alpha-olefins, one or more, preferably unconjugated, dienes, hydrogen and one or a number of inert gases such as nitrogen or C1 to C6 (preferably C2 to C5) alkanes such as e.g. ethane or propane may open into the external circulation conduit (5).

The process according to the invention is particularly suitable for manufacturing polyolefins in powder form, in particular high or linear low density polyethylene, of, relative density ranging, for example, from 0.87 to 0.97, or of polypropylene, or of copolymers of propylene with ethylene and/or C4 to C8 olefins, or of elastomeric copolymers of propylene with ethylene and optionally at least one unconjugated diene, of relative density ranging, for example, from 0.85 to 0.87. The polymers manufactured according to the present process may in particular be powders corresponding essentially to the B type and sometimes to the A and B types, according to the classification given by D. Geldart in "Gas Fluidization Technology" published in "A. Wiley-Interscience Publication" by John-Wiley & Sons (1986), pages 33 to 46. The polymers may consist of particles which have a mass-average diameter ranging from 300 to 2000, preferably from 500 to 1500 $\mu$m.

The process for gas phase continuous polymerization of olefin(s) is carried out in a reactor containing a fluidized and optionally mechanically stirred bed maintained at an absolute pressure P1 which can range from 0.5 to 6, preferably from 1 to 4 MPa. The, temperature of the fluidized bed may be maintained at a value ranging from 30 to 130° C., preferably from 50 to 110° C. A gas reaction mixture passes through the reactor at an upward speed which may range from 0.3 to 1 m/s, preferably from 0.4 to 0.8 m/s. The reaction gas mixture may contain one or more olefins, especially from C2 to C10, preferably from C2 to C8, for example ethylene or propylene, or a mixture of ethylene with at least one C3 to C10, preferably C3 to C8, olefin, for example propylene, 1-butene, 1-hexene, 4-methyl-1-pentene or 1-octene and/or else with at least one diene, for example an unconjugated diene. It may also contain hydrogen and/or an inert gas such as nitrogen or an alkane, for example from C1 to C6, preferably from C2 to C5.

The polymerisation reaction may be carried out in the presence of a catalyst system, of the Ziegler-Natta type, said catalyst essentially comprising a compound of a transition metal, e.g. at least one transition metal belonging to groups 4, 5 or 6 of the Periodic Classification of the elements (approved by the Nomenclature Committee of the "American Chemical Society", see "Encyclopedia of Inorganic Chemistry", editor R. Bruce King, published by John Wiley & Sons (1994)).

High-activity catalyst systems have already been known for a number of years and are capable of producing large quantities of polymer in a relatively short time, and thus make it possible to avoid a step of removing catalyst residues from the polymer. These high-activity catalyst systems generally comprise a solid catalyst consisting essentially of atoms of transition metal (preferably titanium and/or vanadium and/or zirconium), of magnesium and of halogen.

The Ziegler-Natta type catalyst can be used directly as such or in the form of a prepolymer. The conversion to prepolymer is generally carried out by bringing the catalyst into contact with one or more alpha-olefins in amounts such that the prepolymer contains between 0.002 and 10 millimol of transition metal per gram.

A co-catalyst may also be advantageously used with the Ziegler-Natta catalyst such as organometallic compounds of metals belonging to Groups I, II or III of the Periodic Table of the elements, in particular organoaluminium compounds.

The process is particularly suitable for use with magnesium supported Ziegler catalysts, in particular those disclosed in U.S. Pat. No. 4,260,709, EP598094, EP99774 and EP175532. The process is also particularly suitable for use with Ziegler catalysts supported on silica, in particular those disclosed in WO9309147, WO9513873, WO9534380 and WO9905187, the content of which is hereby incorporated by reference.

It is also possible to employ a high activity catalyst essentially comprising a chromium oxide activated by a heat treatment and used in combination with a granular support based on refractory oxide. In particular, those disclosed in EP275675, EP453116 and WO9912978 are hereby incorporated by reference.

The polymerisation process is also particularly suitable for being employed with metallocene type catalysts such as zirconocene, hafnocene, titanocene or chromocene.

For example, the polymerisation reaction may be carried out using a metallocene type catalyst such as those described in EP 0 129368, EP 0 206794, EP 0 420436 and EP 0 416815 the subject matter of which is incorporated herein by reference.

It is also possible to use late transition metal e.g. platinum or palladium, catalyst complexes such as those described in WO 9623010 the subject matter of which is incorporated herein by reference.

The process can also be applied with the iron and/or cobalt complexes catalysts, e.g. such as those disclosed in WO98/27124 or impending application WOGB98/2638.

The catalyst may suitably be employed in the form of a prepolymer powder prepared beforehand during a prepolymerisation stage with the aid of a catalyst as described above. The prepolymerisation may be carried out by any suitable process, for example, polymerisation in a liquid hydrocarbon diluent or in the gas phase using a batch process, a semi-continuous process or a continuous process.

For details on prepolymerisation see U.S. Pat. Nos. 4,923, 833, 5,283,278 and 4,921,825 and EP-B-0279 863 all of which are herein fully incorporated by reference.

In another embodiment of the invention, the catalyst system of the invention includes an antistatic agent, for example, those described in U.S. Pat. No. 5,283,278, which is fully incorporated herein by reference. Non-limiting examples of antistatic agents include, alcohol, thiol, silanol, diol, ester, ketone, aldehyde, acid, amine, and ether compounds. Tertiary amines, ethoxylated amines, and polyether compounds are preferred. The antistatic agent can be added at any stage in the formation of the supported catalyst system of the invention.

In another embodiment of the invention, the catalyst system of the invention includes a polyolefin wax or tackifier or the like.

The polymerisation reaction may be conducted in a reactor containing a fluidised bed by techniques known per se and using equipment such as that described in French patent No. 2 207 145, French patent No. 2 335 526, EP-B-0 699213, EP-B-0 89691 or U.S. 5,352,749, the disclosure of which are incorporated herein by reference.

The advantages of the process according to the invention are numerous. In fact, the process is not only simple, reliable and easy to implement, but it also makes it possible by early detection of reactor fouling occurring during the polymerization to react rapidly and thus minimise and/or radically eliminate the problems associated with reactor fouling.

The experience shows that the process according to the present invention allows operation of a gas phase reactor in a more safe and reliable way.

Another very important advantage associated with the use of the process according to the present invention is that it allows the difference between reversible and potentially irreversible fouling problems to be identified. As already explained above, there are many different methods in the art which were developed in order to take corrective actions against fouling phenomenon; such methods are based on a hypothetical scientific explanation of the fouling phenomenon and its corresponding measurement, e.g. temperature probe measurement or static probe measurement as disclosed in EP-224479. The fouling phenomenon measurement disclosed in the prior art relates to highly localised phenomena which are not necessarily representative of the overall phenomena occurring in the total reactor vessel. This problem associated with the prior art methods is now solved with the process according to the present invention.

Indeed, according to the present invention, a reversible fouling problem is detected when one or more switches give the indicative signal (alarm) corresponding to an agglomerate falling on the said switches and then reset automatically (i.e. went back to its original position). This may happen some time during polymerisation without leading to highly detrimental problems and without necessarily inducing any corrective action. If this appears to happen more often, i.e. with an increasing frequency, then those frequent agglomerate falls on the grid are representative of a more serious fouling problem that might be solved by applying corrective actions, e.g. by fine tuning the process operating conditions.

According to the present invention, a potential irreversible fouling problem is detected when one or more switches give the indicative signal (alarm) corresponding to agglomerates falling on the said switches and then do not reset automatically (i.e. do not return to its original position). This kind of detection is representative of a very important fouling problem which requires an urgent corrective action to be taken.

In view of the hereabove specific embodiment of the present invention, it is obvious that the present invention represents a very valuable tool for the polymerisation industry. It is also clear that the present invention is not limited to the specific embodiments hereindisclosed.

For example, depending on the number of detecting devices protruding through the grid and further to some complementary experimentation, it is even possible to determine the amounts and sizes of the agglomerates falling on the fluidisation grid, i.e. to build a digital print of the fouling phenomenon occurring in the reactor.

EXAMPLE 1

During a normal production run in linear low density polyethylene (LLDPE) in a period of two minutes four alarms of the detection system occurred. No action was taken during this time. During the next two hours nearly all detection systems started alarming, but it was possible to quit them. A blockage of all the power withdrawal lines five hours after the first alarm-caused a shut down of the plant.

EXAMPLE 2

During a high density polyethylene (HDPE) production run two alarms of the detection system showed up. The catalyst injection system was directly stopped and the gas-phase in the reactor was purged. After changing the gas-phase composition and lowering the bed-level in the agglomerate dump bin one big sheet was found. The plant was restarted without any problem and no further alarm of the detection system showed up.

What is claimed is:

1. A process for the early detection of reactor fouling occurring during a gas phase polymerisation of olefin(s) using a fluidized bed reactor having a fluidization grid, comprising fitting an upper part of the fluidization grid with devices capable of detecting polymer agglomerates hitting said devices and giving an indicative signal thereof, said devices being automatically resettable to allow a device to give a further signal in case of another encounter with an agglomerate hitting said device.

2. Process according to claim 1 wherein the devices comprise detection switches which protrude through the grid and give the indicative signal of the presence of agglomerates on the grid.

3. Process according to claim 1 wherein the devices are mechanical, electrical, electromechanical or pneumatic devices, or a combination of one or more thereof.

4. Process according to claim 3 wherein the devices are electromechanical devices.

5. Process according to claim 1 wherein the fluidized bed reactor is cylindrical and the fluidization grid is a disc having a diameter of between 2 and 7 m.

6. Process according to claim 1 wherein the fluidization grid is fitted with at least four devices capable of detecting the polymer agglomerates.

* * * * *